United States Patent

Miyakawa

[11] Patent Number: 5,841,568
[45] Date of Patent: Nov. 24, 1998

[54] OPTICAL MODULATOR AND METHOD OF MANUFACTURING THE SAME

[75] Inventor: Tosiya Miyakawa, Tokyo, Japan

[73] Assignee: NEC Corporation, Tokyo, Japan

[21] Appl. No.: 623,926

[22] Filed: Mar. 28, 1996

[30] Foreign Application Priority Data

Mar. 29, 1995 [JP] Japan ..................................... 7-071010

[51] Int. Cl.$^6$ ..................................................... G02F 1/03
[52] U.S. Cl. ........................... 359/245; 430/290; 430/15; 430/16; 430/18; 430/321; 385/131; 385/2; 385/8
[58] Field of Search ............................... 430/290, 15, 16, 430/18, 321; 385/131, 2, 8; 359/245

[56] References Cited

U.S. PATENT DOCUMENTS

| | | | |
|---|---|---|---|
| 5,050,948 | 9/1991 | Hawkins, II et al. | 385/2 |
| 5,138,480 | 8/1992 | Dolfi et al. | 359/251 |
| 5,404,412 | 4/1995 | Seino et al. | 385/2 |
| 5,502,780 | 3/1996 | Madabhushi | 385/3 |
| 5,563,965 | 10/1996 | Madabhushi | 385/2 |

FOREIGN PATENT DOCUMENTS

| | | | |
|---|---|---|---|
| 63-261219 | 10/1988 | Japan | G02F 1/03 |
| 4-217226 | 8/1992 | Japan | G02F 1/035 |

*Primary Examiner*—M. Nuzzolillo
*Assistant Examiner*—Steven H. VerSteeg
*Attorney, Agent, or Firm*—Ostrolenk, Faber, Gerb & Soffen, LLP

[57] ABSTRACT

An optical modulator includes a substrate having an electrooptic effect, an optical waveguide formed on a surface of the substrate, and a control electrode formed on the substrate, and a control electrode formed on the substrate to oppose the optical waveguide. In this optical modulator, the control electrode is formed by stacking a plurality of layers in a direction perpendicular to the substrate surface.

8 Claims, 6 Drawing Sheets

OPTICAL MODULATOR AND METHOD OF MANUFACTURING THE SAME

BACKGROUND OF THE INVENTION

1. Field of the Invention

The present invention relates to an optical modulator and, more particularly, to an optical waveguide type optical modulator in which the modulation band is improved by improving the structure of a control electrode and which can perform high-speed transmission, and a method of manufacturing the same.

2. Description of the Prior Art

In recent optical communication technologies, a high-speed modulation method is preferred to a conventional method which directly modulates a laser diode or the like device, in order to achieve optical communication at a higher speed. An optical modulator using an electrooptic effect, particularly an optical waveguide type optical modulator in which an optical waveguide is formed by diffusing Ti (titanium) into a substrate, has extensively attracted attention because this modulator has excellent characteristics, i.e., so-called chirping (the functuation of wavelength) is small and high-speed modulation is possible. Conventional optical modulators of this type are constituted by a travelling-wave electrode using a coplanar line and a Mach-Zehnder optical waveguide, as disclosed in the second embodiment of Japanese Unexamined Patent Publication No. 63-261219. Also, the control electrodes of these optical waveguides are formed by a selective gold plating process as disclosed in Japanese Unexamined Patent Publication No. 4-217226. Consequently, optical modulators having a band of 20 GHz and an operating voltage of about 5 V are realized.

FIGS. 1 and 2 illustrate the structure of a conventional optical modulator. FIG. 1 is a plan view, and FIG. 2 is a sectional view taken along the line II—II in FIG. 1.

In this optical modulator, a single-mode optical waveguide 42 is formed on a lithium niobate (LiNbO$_3$) substrate 41, and an electrode 45 is formed on the optical waveguide 42. This optical waveguide 42 is formed by diffusing Ti into the substrate 41. The optical waveguide 42 extends from one end of the substrate 41 and branches into two arm waveguides 43 and 44 from a Y branch. These arm waveguides 43 and 44 pass beneath the signal electrode 45 and one ground electrode 46, respectively, and again join from a Y branch, thereby constituting a Mach-Zehnder interference system.

The signal electrode 45 and the ground electrodes 46 constitute a coplanar line (to be referred to as a CPW electrode hereinafter). A width W of the signal electrode 45 and electrode gaps G between the signal electrode 45 and the ground electrodes 46 are so set that the characteristic impedance of these electrodes is 50 Ω. Additionally, a buffer layer 47 is formed by using an SiO$_2$ film between the optical waveguide 42 and the signal and ground electrodes 45 and 46 in order to prevent absorption of light by, e.g., the electrode 45.

FIGS. 3A to 3E are sectional views showing a method of forming the gold-plated electrodes of the above conventional optical modulator in the order of formation steps.

In the step shown in FIG. 3A, waveguides 43 and 44 are formed by Ti diffusion on an LiNbO$_3$ substrate 41, and an SiO$_2$ film 47 as a buffer layer is formed on the waveguides 43 and 44. Thereafter, chromium/gold (Cr/Au) films, for example, are vapor-deposited to have thicknesses of 100 Å and 1000 Å, respectively, as a plating undercoating film 48.

In the step shown in FIG. 3B, a photoresist film 49 about 10 μm thick is formed on the plating undercoating film 48 by spin-coating.

In the step shown in FIG. 3C, portions serving as electrode formation regions of the photoresist film 49 are removed by photolithography.

In the step shown in FIG. 3D, electroplating is performed for about 30 min at a current density of 4 mA/cm$^2$ by using a non-cyanic gold-plating solution, thereby forming a signal electrode 45 and ground electrodes 46.

Finally, in the step illustrated in FIG. 3E, the photoresist film 49 is removed by a peeling solution, and the plating undercoating film 48 is removed by wet-etching from portions except the electrode formation regions. Although the electrode 45 and the ground electrodes 46 also are etched, the etch amount is very small and hence can be ignored. FIG. 4 shows the measurement result of the frequency characteristic of this conventional optical modulator when the modulating voltage was 3.2 V.

To improve the modulation band of optical modulators of the above sort and realize a higher transmission speed, the following three points are important subjects to be achieved.

1. To suppress the modulating voltage.

It is generally known that the modulation band can be improved by decreasing the electrode length of an optical modulator. However, the modulating voltage increases in inverse proportion to the electrode length. Accordingly, the modulating voltage increases when the length of an electrode is decreased, and this makes an optical modulator difficult to drive at a high speed with a large voltage amplitude. Therefore, improving only the modulation band without increasing the modulating voltage is an important subject to realize high-speed transmission.

2. To match the impedance of an optical modulator with the impedance of a coaxial cable for supplying input signals.

Usually, the characteristic impedance of a coaxial cable is designed to be 50 Ω. Therefore, it is preferable that an optical modulator to which a coaxial cable is connected have the same impedance characteristic, 50 Ω. Accordingly, since the characteristic impedance of a CPW electrode is always determined by the ratio W/G of the width W of the signal electrode to the gap G between the signal and ground electrodes, the structure of the electrode must be appropriately set such that the characteristic impedance is 50 Ω.

3. To reduce the propagation loss of a microwave signal in the CPW electrode.

In a traveling-wave electrode, a microwave signal attenuates as it propagates in the electrode. The propagation loss of a microwave signal is nearly inversely proportional to the sectional area of the signal electrode. Therefore, to reduce the propagation loss of a microwave it is necessary to increase the thickness or width of the signal electrode to thereby increase the sectional area of the electrode.

In the structure of the conventional optical modulator described previously, on the other hand, the electrode gap must be set to between 20 and 30 μm or less to meet the condition of the modulating voltage described in item 1 above. From this condition and the condition of impedance matching described in item 2 above, the electrode width W is 6 to 10 μm, nearly the same as the waveguide width. Accordingly, to increase the sectional area in order to realize a reduction in the propagation loss of a microwave which is the condition described in item 3 above, the only possible way is to increase the thickness of the electrode. However, since the electrodes are manufactured by the method illustrated in FIGS. 3A to 3E, the thickness of the signal electrode 45 cannot be increased to be larger than the film thickness of the photoresist film 49 used in photolithography. That is, the electrode thickness is limited to approximately 15 µm.

As described above, in conventional optical modulators the propagation loss of a microwave cannot be sufficiently reduced due to the various limiting conditions, and this makes broadening of the band difficult to realize.

SUMMARY OF THE INVENTION

The present invention has been made in consideration of the above situation in the conventional technologies and has as its object to provide an optical modulator capable of performing higher-speed transmission with an improved modulation band, and a method of manufacturing this optical modulator.

To achieve the above object, according to the first fundamental aspect of the present invention, there is provided an optical modulator comprising a substrate having an electrooptic effect, an optical waveguide formed on a surface of the substrate, and a control electrode formed on the substrate to oppose the optical waveguide, wherein the control electrode is formed by stacking a plurality of layers in a direction perpendicular to the substrate surface.

According to the first supplementary aspect of the present invention, there is provided an optical modulator described in the above first fundamental aspect, wherein the control electrode consists of a signal electrode and a ground electrode formed to oppose the signal electrode, and a ratio of a width of the signal electrode in a direction parallel to the substrate surface to an electrode gap between the signal electrode and the ground electrode is kept constant throughout the layers of the control electrode.

According to the second supplementary aspect of the present invention, there is provided an optical modulator described in the above first supplementary aspect, wherein the ratio of the width of the signal electrode to the electrode gap between the signal electrode and the ground electrode is so set that a characteristic impedance in each layer of the control electrode is equal to a characteristic impedance of a line connected to the optical modulator.

According to the third supplementary aspect of the present invention, there is provided an optical modulator described in the above first supplementary aspect, wherein the signal electrode is so formed that the width of the signal electrode is increased step by step from a lowermost layer to an uppermost layer of the signal electrode, and the ground electrode is so formed that the width of the ground electrode is decreased step by step from a lowermost layer to an uppermost layer of the ground electrode.

According to the fourth supplementary aspect of the present invention, there is provided an optical modulator described in the above third supplementary aspect, wherein the uppermost layer of the signal electrode is so formed that an end portion of the uppermost layer does not hang over an opposing end portion of the lowermost layer of the ground electrode.

Furthermore, to achieve the above object, according to the first fundamental aspect of the present invention, there is provided a method of manufacturing an optical modulator including a substrate having an electrooptic effect, an optical waveguide formed on a surface of the substrate, and a control electrode formed on the substrate to oppose the optical waveguide, comprising the step of repetitively performing a photolithography step and a plating step a plurality of number of times, thereby forming the control electrode having a plurality of layers.

As described in the above aspects, in the optical modulator of the present invention, the electrode is formed by a plurality of layers and this increases the sectional area of the electrode.

Also, the width of the signal electrode is increased step by step toward the upper layers, and the ratio of the width of the signal electrode to the electrode gap between the signal and ground electrodes is kept constant. Accordingly, it is possible to increase the sectional area of the electrode and set the characteristic impedance of the electrode at a predetermined value.

With these improvements, the modulation band is improved without increasing the modulating voltage, and as a consequence an optical modulator capable of higher-speed optical transmission is realized.

Additionally, in the manufacturing method of the present invention the electrodes are formed by repeating the photoresist film formation step and the plating step. Therefore, it is possible to stack layers of the electrode on the substrate and set the width and the electrode gap in each layer of the electrode to respective arbitrary values. Accordingly, it is possible to easily and reliably form a multilayered electrode which consists of a signal electrode and a ground electrode and in which the electrode width and the electrode gap are kept constant.

DETAILED DESCRIPTION OF THE PREFERRED EMBODIMENT

An embodiment of an optical modulator according to the present invention will be described below with reference to the accompanying drawings.

Figure 5:
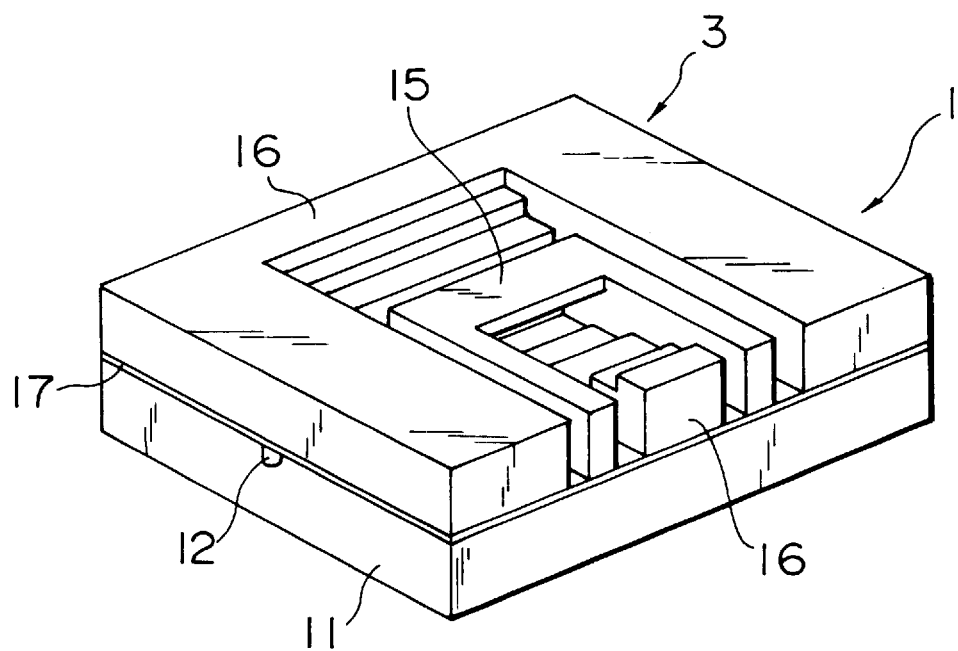
FIG. 5 is a perspective view showing one embodiment of an optical modulator according to the present invention.
Figure 6:
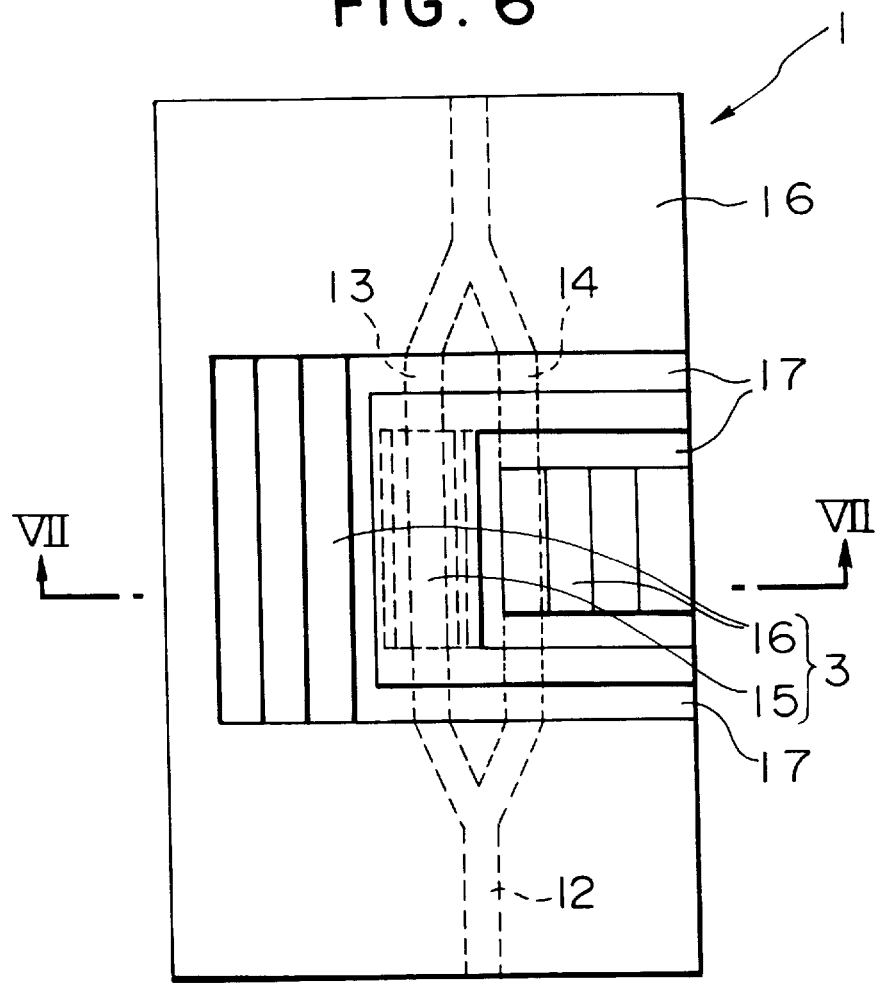
FIG. 6 is a plan view showing the embodiment of an optical modulator according to the present invention.
Figure 7:
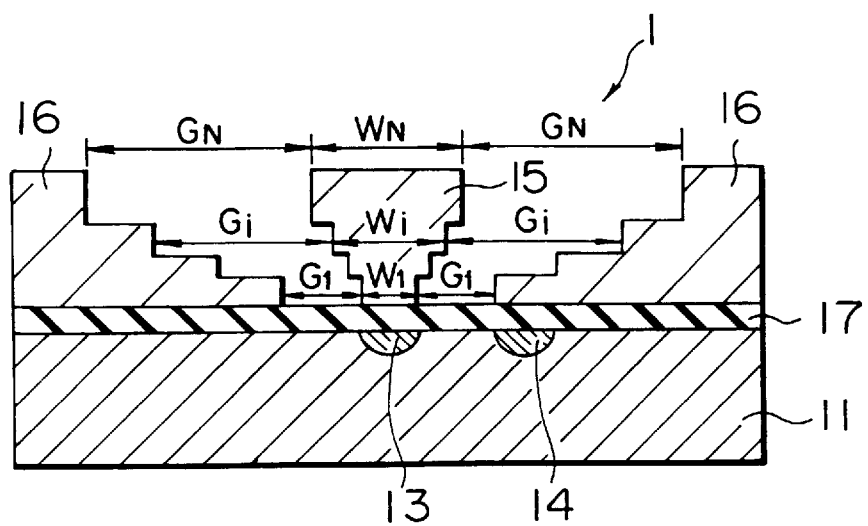
FIG. 7 is a sectional view taken along the line VII—VII in FIG. 6.

FIG. 5 is a perspective view of an optical modulator 1, FIG. 6 is a plan view of the modulator, and FIG. 7 is a sectional view taken along the line VII—VII in FIG. 6.

The optical modulator 1 consists of a substrate 11, an optical waveguide 12 formed on the substrate 11, a control electrode 3 corresponding to the optical waveguide 12, a buffer layer 17 formed between the substrate 11 and the electrode 3, and the like components.

The substrate 11 is made from lithium niobate (LiNbO$_3$). The optical waveguide 12 is formed by diffusing Ti on the upper surface of the substrate 11. The optical waveguide 12 is a single-mode optical waveguide. As illustrated in FIG. 6, this optical waveguide 12 branches into two arm waveguides 13 and 14 from a Y branch. These two arm waveguides 13 and 14 extend parallel to each other and again join into the optical waveguide 12 from another Y branch. On the upper surface of the substrate 11 in which the optical waveguide 12 is formed, the buffer layer 17 made from an SiO$_2$ film is formed to prevent absorption of light in the optical waveguide by the electrode 3.

The electrode 3 consists of a signal electrode 15 and ground electrodes 16. The signal electrode 15 is formed above the arm waveguide 13, and one of the ground electrodes 16 is so formed as to extend to a portion above the arm waveguide 14. These electrodes constitute a Mach-Zehnder interference system. The electrode 3 consisting of the signal electrode 15 and the ground electrodes 16 is formed into layers by gold-plating and constitutes a CPW electrode as a whole.

Details of the structure will be described below with reference to FIG. 7. The signal electrode 15 is formed by stacking, e.g., four layers in the direction of thickness (a direction perpendicular to the substrate surface) such that a width $W_l$ in a direction parallel to the substrate surface of the lowermost portion in contact with the buffer layer 17 is almost the same as the width of the optical waveguide 13 and this width, $W_i$, increases toward the upper layers.

In accordance with this increase in the width of the signal electrode 15 toward the upper layers, the width of the ground electrodes 16 decrease toward the upper layers in order to keep predetermined gaps (to be simply referred to as electrode gaps hereinafter) with respect to the signal electrode 15. An electrode gap $G_i$ and the width $W_i$ of the signal electrode 15 are so controlled as to always meet the relationship $W_l/G_l = W_i/G_i$ in each layer. That is, $W_l/G_l$, is set to be the same as 50 Ω, the characteristic impedance of a coaxial cable to be connected. Accordingly, the ratio $W_i/G_i$ is so set that the characteristic impedance in each layer is 50 Ω. For example, when $W_l = 7$ μm and $W_N = 25$ μm, $G_l = 21$ μm and $G_N = 75$ μm. Note that the end portions of the uppermost layer of the signal electrode 15 near the ground electrodes 16 are so formed as not to reach (hang over) the end portions of the lowermost layers of the ground electrodes 16 near the signal electrode 15.

As described above, the electrode 3 is formed by multiple layers, and the width $W_l$ of the lowermost layer of the signal electrode 15 is formed to be nearly equal to the width of the optical waveguide 13. Additionally, the width $W_i$ of the signal electrode 15 increases toward the upper layers, and the ratio of the width $W_i$ of the signal electrode to the electrode gap $G_i$ is kept constant. Consequently, the sectional area of the signal electrode 15 can be increased without changing the characteristic impedance of the electrode 3. Accordingly, in this optical modulator 1 the propagation loss of a microwave can be reduced compared to that in optical modulators with conventional structures. As a result, it is possible to improve the modulation band without increasing the modulating voltage and thereby realize higher-speed optical transmission.

Although the electrode 3 is formed by stacking four layers in this embodiment, the number of stacked layers in the present invention is not limited to four. Also, the ground electrodes 16 are formed on both the sides of the signal electrode 15. However, only one ground electrode 16 can be formed near the arm waveguide 14. Furthermore, the width W of the signal electrode 15 and the electrode gap G in each layer are changed step by step. However, in the present invention the width of the signal electrode and the electrode gap can remain unchanged from the lowermost layer to the uppermost layer. With this structure, a gold-plated electrode 3 with a large thickness can be formed on the substrate 11 by using the same structure as in conventional optical modulators.

A method of manufacturing the optical modulator 1 according to the present invention will be described below with reference to FIGS. 8A to 8H.

Figure 8A:
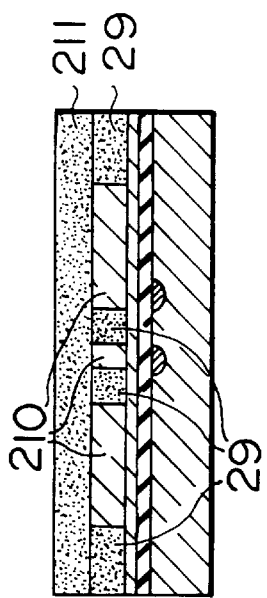
FIGS. 8A to 8H are sectional views showing a method of forming gold-plated electrodes of the optical modulator according to the present invention in the order of formation steps.

In the step shown in FIG. 8A, Ti is diffused into a LiNbO$_3$ substrate 11 to form waveguides 13 and 14, and an SiO$_2$ film 17 as a buffer layer is formed on the substrate 11. Thereafter, chromium/gold (Cr/Au) films, for example, are vapor-deposited to have thicknesses of 100 Å/1000 Å, respectively, as a plating undercoating film 28.

Figure 8B:
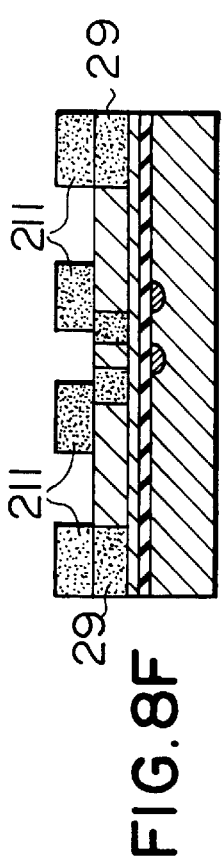

In the step shown in FIG. 8B, a first photoresist film 29 about 8 μm thick is formed on the upper surface of the plating undercoating film 28 by spin-coating.

Figure 8C:
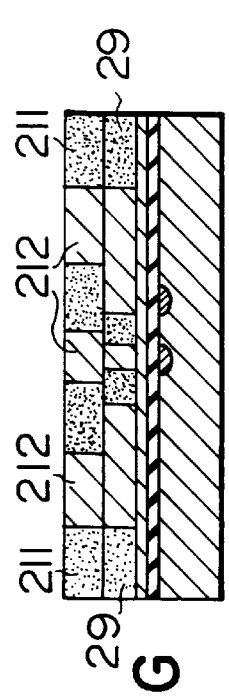

In the step shown in FIG. 8C, portions serving as electrode formation regions of the first photoresist film 29 are removed by photolithography.

Figure 8D:
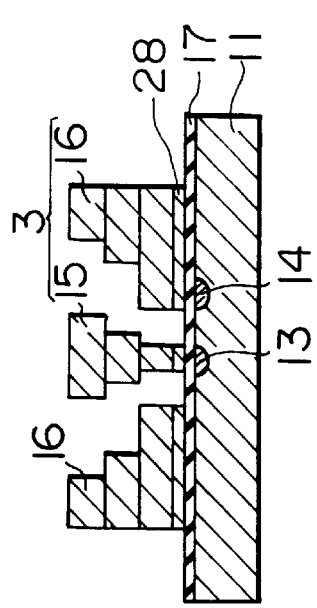

In the step shown in FIG. 8D, a first gold-plating layer 210 is formed by performing electroplating at a current density of 4 mA/cm$^2$ by using a non-cyanic gold-plating solution. The thickness of this gold-plating layer 210 is approximately 8 μm.

Figure 8E:
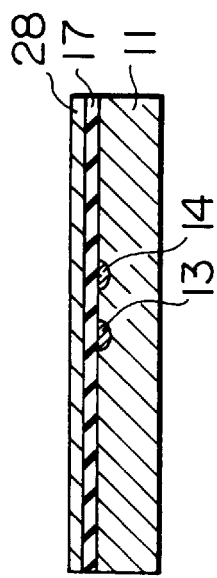

In the step illustrated in FIG. 8E, a second photoresist film 211 is formed by spin-coating on the gold-plating layer 210 formed in the first electrode formation regions and the first photoresist film 29.

Figure 8F:
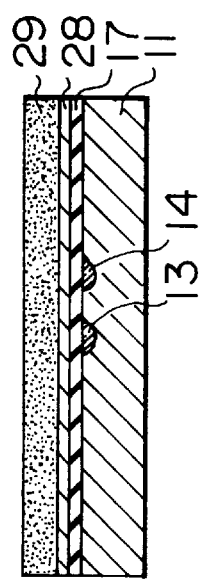

In the step illustrated in FIG. 8F, portions serving as electrode formation regions of the second photoresist film 211 are removed by photolithography.

Figure 8G:
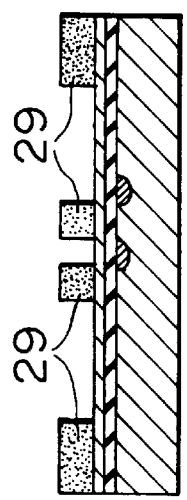

In the step shown in FIG. 8G, as in the step in FIG. 8D, a second gold-plating layer 212 is formed by performing electroplating at a current density of 4 mA/cm$^2$ by using a non-cyanic gold-plating solution.

Figure 8H:
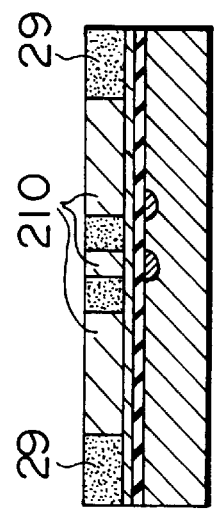

In the step shown in FIG. 8H, the steps shown in FIGS. 8E and 8G are repeated until a desired number of layers are obtained, thereby forming a multilayered electrode 3 on the substrate 11. Thereafter, the photoresist films formed in the individual layers are removed by a peeling solution, and the plating undercoating film 28 is removed by wet-etching from portions except the electrode formation regions. Note that the etch amount of the electrode (electrodes 15 and 16) is very small and hence can be neglected.

With the above method, a multilayered electrode 3 in which the thickness of the electrode in each layer is, e.g., 8 μm, can be easily and reliably formed on the substrate 11 such that the width $W_i$ of the signal electrode 15 is increased step by step toward the upper layers and the width $W_i$ of the signal electrode 15 has a predetermined ratio to the electrode gap $G_i$ between the signal electrode 15 and each ground electrode 16.

In the manufacturing method according to the present invention as described above, by repeating the photoresist film formation step and the plating step a multilayered electrode 3 in which the width W of the signal electrode and the electrode gap G are different from one layer to another can be formed on the substrate 11. Consequently, it is possible to form an electrode having a wide sectional area which cannot be realized by conventional electrode formation methods.

Figure 1:
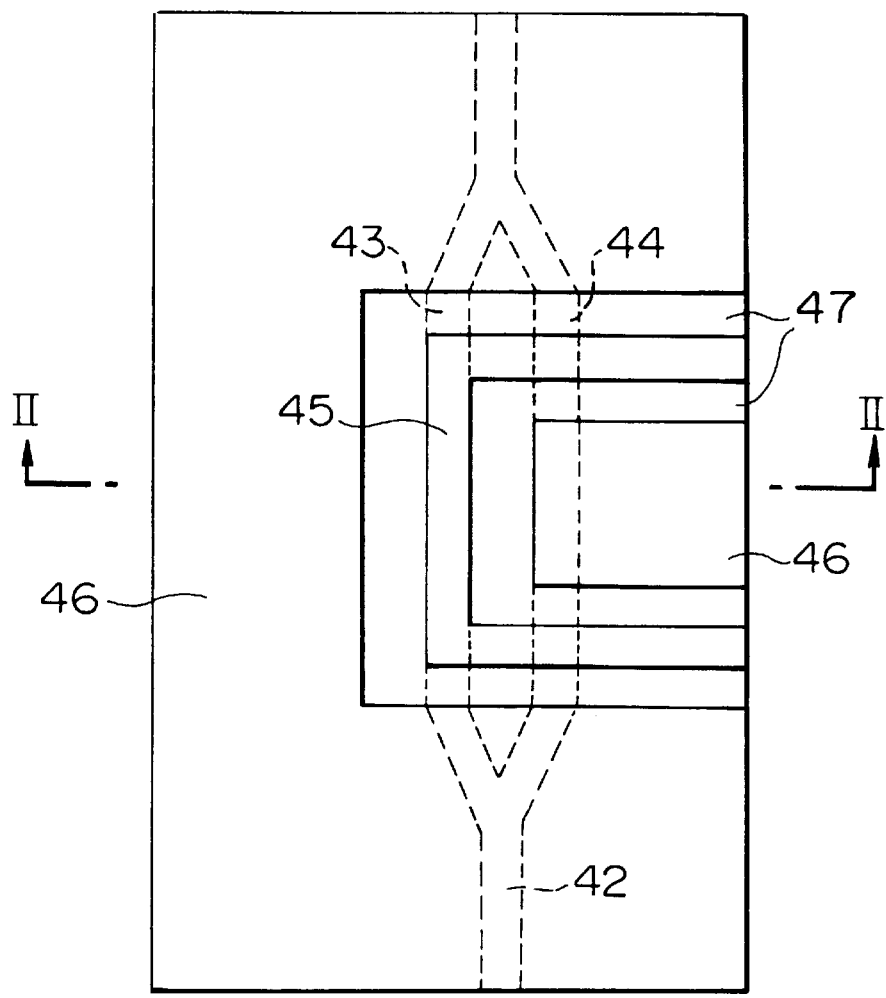
FIG. 1 is a plan view showing a conventional optical modulator.
Figure 2:
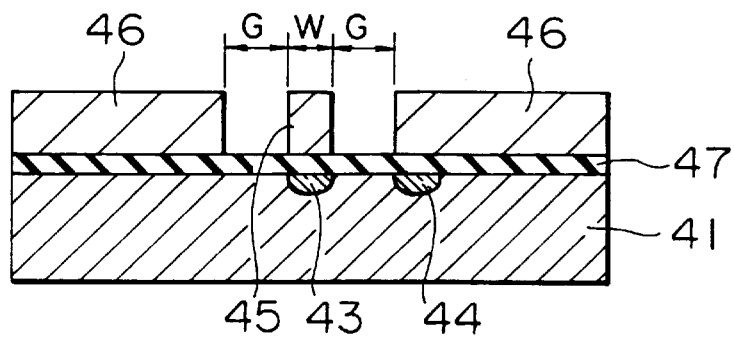
FIG. 2 is a sectional view taken along the line II—II in FIG. 1.
Figure 3A:
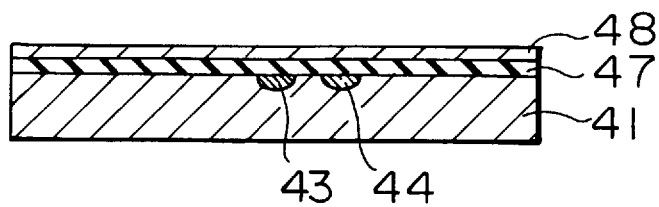
FIGS. 3A to 3E are sectional views showing a method of forming gold-plated electrodes of the conventional optical modulator in the order of formation steps.
Figure 3B:
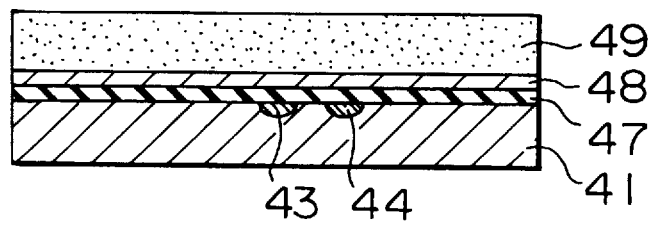
Figure 3C:
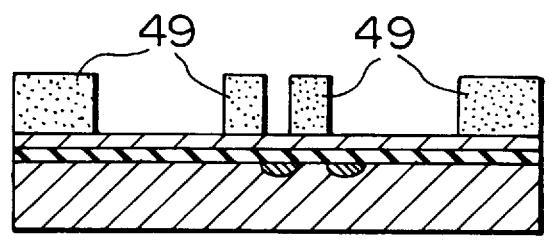
Figure 3D:
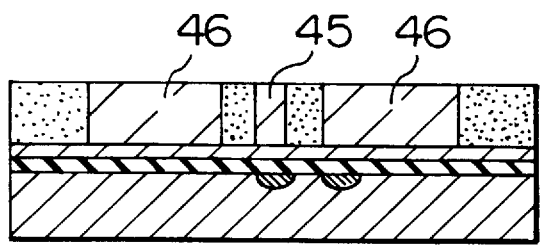
Figure 3E:
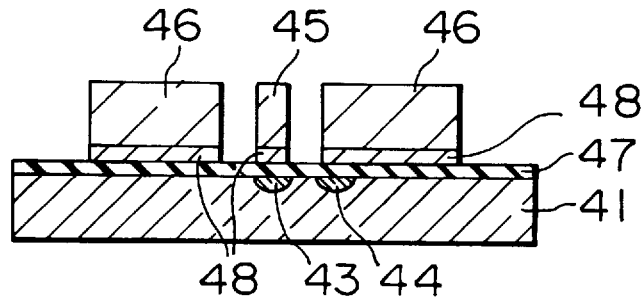
Figure 4:
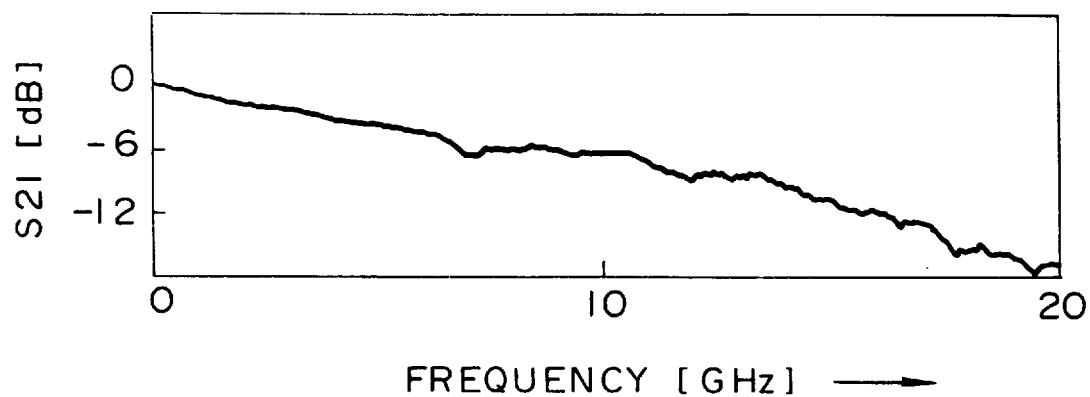
FIG. 4 is a graph showing the frequency characteristic of the conventional optical modulator.
Figure 9:
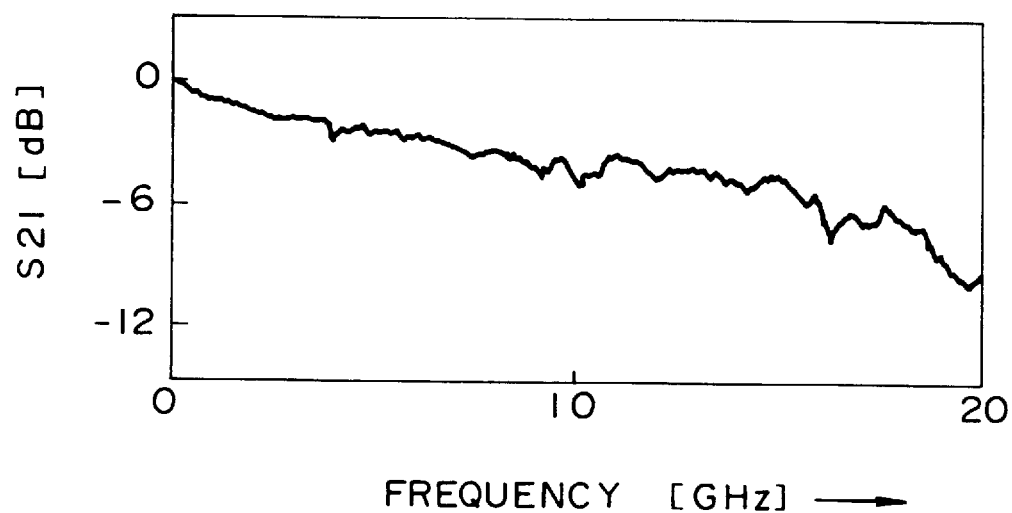
FIG. 9 is a graph showing the frequency characteristic of the optical modulator of the present invention.

FIG. 9 shows the measurement result of the frequency characteristic of the optical modulator according to the present invention. The modulating voltage is the same voltage, 3.2 V, as in the conventional example described earlier. Comparing FIG. 9 with FIG. 4 shows that the optical modulator of the present invention is greatly improved in the frequency characteristic.

In the above embodiment, an LiNbO$_3$ substrate is used as the substrate 11, and a Mach-Zehnder optical modulator including a CPW electrode is formed on this substrate 11. However, the present invention is not limited to this embodiment. For example, it is possible to use semiconductors such as GaAs and InP, LiTaO$_3$, and some other substrate materials having an electrooptic effect. Also, the optical modulator of the present invention is effectively applicable to an asymmetrical coplanar stripline, a symmetrical coplanar stripline, and some other traveling-wave electrodes, or to a directional coupler type optical modulator, a phase modulation type optical modulator, and optical modulators using some other modulation methods.

What is claimed is:

1. An optical modulator comprising:
    a substrate having an electrooptic effect;
    an optical waveguide formed on a surface of said substrate; and
    a control electrode formed on said substrate to oppose said optical waveguide, said control electrode is formed by stacking a plurality of layers in a direction perpendicular to the substrate surface, said control electrode comprising a signal electrode and a ground electrode formed to oppose said signal electrode, wherein a ratio of a width of said signal electrode in a direction parallel to the substrate surface to an electrode gap between said signal electrode and said ground electrode is kept constant throughout the layers of said control electrode.

2. A optical modulator according to claim 1, wherein the ratio of the width of said signal electrode to the electrode gap between said signal electrode and said ground electrode is so set that a characteristic impedance in each layer of said control electrode is equal to a characteristic impedance of a line connected to said optical modulator.

3. A optical modulator according to claim 1, wherein said signal electrode is so formed that the width of said signal electrode is increased step by step from a lowermost layer to an uppermost layer of said signal electrode, and said ground electrode is so formed that the width of said ground electrode is decreased step by step from a lowermost layer to an uppermost layer of said ground electrode.

4. A optical modulator according to claim 3, wherein the uppermost layer of said signal electrode is so formed that an end portion of the uppermost layer does not hang over an opposing end portion of the lowermost layer of said ground electrode.

5. A method of manufacturing an optical modulator including a substrate having an electrooptic effect, an optical waveguide formed on a surface of said substrate, and a control electrode formed on said substrate to oppose said optical waveguide, comprising the step of repetitively performing a photolithography step and a plating step a plurality of number of times, thereby forming said control electrode having a plurality of layers,
    said control electrode comprising a signal electrode and a ground electrode formed to oppose said signal electrode wherein a ratio of a width of said signal electrode in a direction parallel to the substrate surface to an electrode gap between said signal electrode and said ground electrode is kept constant through the layers of said control electrode.

6. A method according to claim 5, wherein the ratio of the width of said signal electrode to the electrode gap between said signal electrode and said ground electrode is so set that a characteristic impedance in each layer of said control electrode is equal to a characteristic impedance of a line connected to said optical modulator.

7. A method according to claim 5, wherein said signal electrode is so formed that the width of said signal electrode is increased step by step from a lowermost layer to an uppermost layer of said signal electrode, and said ground electrode is so formed that the width of said ground electrode is decreased step by step from a lowermost layer to an uppermost layer of said ground electrode.

8. A method according to claim 7, wherein the uppermost layer of said signal electrode is so formed that an end portion of the uppermost layer does not hang over an opposing end portion of the lowermost layer of said ground electrode.

* * * * *